Sept. 10, 1968        G. A. DOTTO        3,401,279
LOW SPEED-HIGH TORQUE MOTOR
Filed March 7, 1966
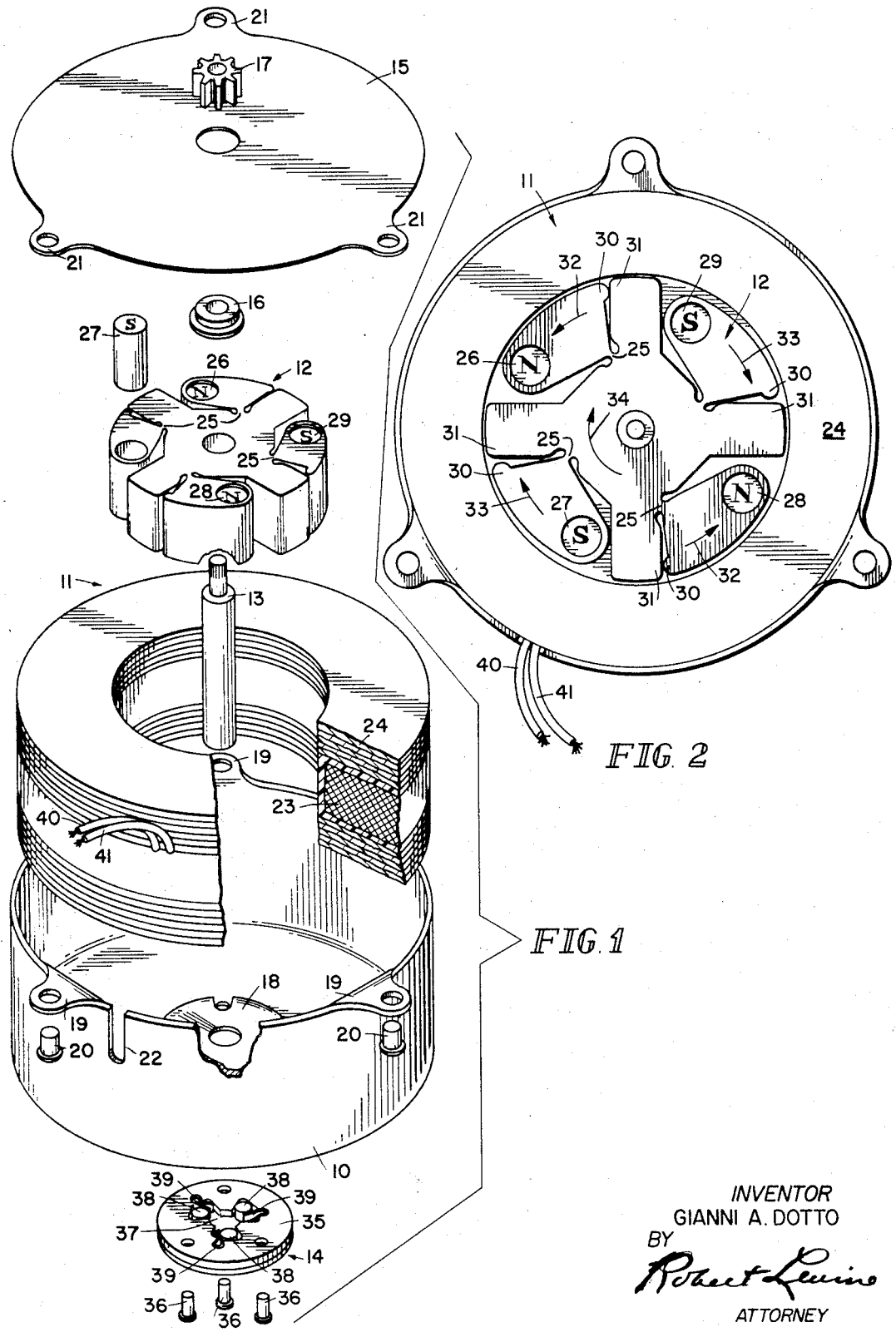
INVENTOR
GIANNI A. DOTTO
BY
*Robert Levine*
ATTORNEY United States Patent Office  3,401,279
Patented Sept. 10, 1968

3,401,279
LOW SPEED-HIGH TORQUE MOTOR
Gianni A. Dotto, Dayton, Ohio, assignor to P. R. Mallory & Co. Inc., Indianapolis, Ind., a corporation of Delaware
Filed Mar. 7, 1966, Ser. No. 532,150
8 Claims. (Cl. 310—22)

The present invention relates to motors and more particularly to the means and methods for providing a novel low speed, high torque motor.

There are many requirements for low speed, high torque motors. These requirements are presently being met by typical rotary motors having a gear reduction means for obtaining the low speed and high torque. The problem with such motors is that the gear reduction means requires extra space, adds to the cost of the motor, and produces undesirable frictional losses.

The motor of the present invention does not require a gear reduction means for providing a low speed or a high output torque. Thus, the output shaft rotates with the rotor and the only friction losses are due to the bearings which support the rotor.

The rotors of most contemporary motors have a plurality of magnetic pole pieces which tend to align with the magnetic field of stator pole pieces. As the magnetic field of the stator changes, the rotor rotates in order to keep the magnetic fields aligned. The motor of the present invention does not rely on aligning of rotor and stator poles to produce rotation of the rotor. Instead, the motor of the present invention utilizes the reaction of vibrating weights pivotally mounted on the rotor to produce a rotary motion.

In the illustrative embodiment of this specification, the rotor is rotatably supported in a casing and circumscribed by a field means for vibrating the aforementioned weights. The field means illustrated is a simple spool wound coil having magnetic metal rings laminated on each side thereof. It can be seen, therefore, that the motor of the present invention is generally similar in appearance to rotary motors having an output shaft concentric with a cylindrically shaped container.

Other features of the motor of the present invention will become apparent as this specification progresses.

It is an object of the present invention to provide a motor having a low output speed and a high output torque.

It is another object of the present invention to provide a low speed, high torque motor which does not have a gear reduction means for coupling the rotor to the output shaft.

It is a further object of the present invention to provide a low speed, high torque motor having only those friction losses inherent in rotatably supporting the rotor.

It is yet another object of the present invention to provide a motor having a rotor with a plurality of pivotally mounted weights and a field means for vibrating said weights so as to rotate said rotor.

It is still another object of the present invention to provide a rotor having a plurality of pivotally mounted weights, field means for vibrating said weights so as to rotate said rotor, and one-way clutch means for maintaining a proper rotational direction for said rotor.

It is still a further object of the present invention to provide a motor having a rotor with a plurality of pivotally mounted permanent magnet slugs and a field means for vibrating said slugs.

FIGURE 1 is an exploded perspective view of the motor of the present invention.

FIGURE 2 is a plane view of the motor illustrating the operation of the permanent magnets in moving the rotor of the motor.

Generally speaking, the present invention is a low speed, high torque motor comprising a casing having a rotor rotatably mounted therein and a field means disposed therein. There are a plurality of weights radially spaced and pivotally mounted on the rotor so as to strike a stiff radial arm of said rotor when said weights are vibrated. Each of said weights has a permanent magnet slug attached thereto. The field means is a means for vibrating the permanent magnet slugs which are attached to the weight. Finally, there is a one-way clutch for preventing backward rotation of said rotor, said clutch being connected to said casing.

Referring now to the drawing, and particularly to the exploded perspective of FIGURE 1, the components and structure of the motor of the present invention can be visualized in conjunction with the following description.

The motor of the present invention is disposed in a cylindrically shaped container 10. The container 10 can be fabricated out of any suitable structural material but will usually be constructed of metal. There is a stator 11 annularly disposed in the container 10. It can be seen that the stator 11 is a hollow cylindrically shaped member which is concentric with the cylindrically shaped container 10. A rotor 12 is disposed within the area circumscribed by the stator 11. The rotor 12, which is also concentric with the cylindrically shaped container, is fixably mounted on a shaft 13. A one-way clutch means 14 is adapted to the container 10 so as to grip the shaft 13 when the rotor 12 rotates in the wrong direction. A circular cover plate 15 is adapted to fit the container 10 so as to cover the stator 11 and rotor 12. There is a bushing 16 inserted in the cover plate 15 to act as a bearing for the shaft 13. A pinion gear 17 is fixably mounted on the portion of the shaft 13 which extends above the cover plate 15 to provide a means for coupling the motor of the present invention to a driven means. There is also a bushing 18 which is affixed to the container so as to provide a bearing for the shaft 13 at the end opposite to the pinion gear 17.

The container 10 is provided with the tabs 19 which are radially spaced so as to correspond to the tabs 21 on the cover plate 15. Rivets 20 are provided to join the tabs 19 to the tabs 21. A slot 22 is provided in the container 10 walls to permit electrical access to the field coil 23 of the stator 11.

The field coil 23 of the stator 11 is an insulated spool wound coil having a predetermined number of turns and size of wire. There are a plurality of flat circular metallic rings laminated to each side of said field coil to provide a magnetic circuit for actuating the permanent magnet weights of the rotor and to dissipate the heat.

An alternating current source for the field coil 23 is applied across the wire leads 40 and 41.

The rotor 12 is a rotary member having a plurality of pivotally mounted magnetic weights radially disposed thereon. In the illustrative embodiment there are four of such weights 26, 27, 28 and 29 equally spaced about the rotor 12. Each of the weights has a distinct north magnetic pole and a distinct south magnetic pole. It can be seen that in the illustrative embodiment two of the weights 26 and 28 are disposed so as to have a north magnetic pole in one axial direction and two weights 27 and 29 are disposed so as to have north magnetic poles in an opposite direction.

The main portion of the rotor 12, which is supported by the shaft 13, can be fabricated of a metallic material or a plastic material. If the main portion of the rotor 12 is plastic, the permanent magnet weights 26, 27, 28 and 29 can flex at the pivot points 25. That is, the portion of the rotor holding the weights can be integrally molded with the main portion of the rotor 12. If the main portion of the rotor is a metal, such as aluminum, the permanent magnet weights 26, 27, 28 and 29 will have to be mechanically pivoted at the pivot point 25.

Referring now to FIGURE 2, a top plane view of the motor with the cover plate 15 removed can be discussed.

When an alternating current is applied across the leads 40 and 41 of the field coil 23, the permanent magnet weights 26, 27, 28 and 29 will vibrate. On one half of an alternation, the permanent magnet weights 26 and 28 are moved in the direction of the arrows 32 and the permanent magnet weights 27 and 29 are moved in the direction of the arrows 33. On the second half of the alternation, the permanent magnet weights 26 and 28 are moved in the direction opposite to the arrows 32 and the permanent magnet weights 27 and 29 are moved in the direction opposite to the arrow 33. Thus, for each complete cycle, the permanent magnet weights 26, 27, 28 and 29 are displaced and then returned to an original position. This displacement is a mechanical vibrating movement which turns the rotor 12.

It can be seen that each portion of the rotor 12 carrying a permanent magnet weight has a striking portion 30 which is adapted to strike the radial arm portion 31 of the main portion of the rotor 12 when the weights vibrate in response to the alternating current applied across the leads 40 and 41 of the field coil 23. Therefore, as the permanent magnet weights are vibrated, the rotor 12 will rotate in the direction of the arrow 34. The one-way clutch means 14 shown in FIGURE 1 will prevent any tendency to rotate in a direction opposite to the arrow 34.

The one-way clutch 14, illustrated in FIGURE 1, can take a variety of forms. In the illustrated form, the disc shaped member 35 is riveted to the container 10 with the rivets 36 so as to be axially aligned with the bushing 18. The rotor shaft 13 extends axially through the opening 37. When the shaft 13 rotates in the wrong direction, the rollers 38 will be wedged against the shaft. When the shaft 13 rotates in the right direction, the rollers are retained in a "free rolling position" by the springs 39.

The torque output of the motor of the present invention is dependent, of course, on several factors such as the weight of the permanent magnets 26, 27, 28 and 29, size of the rotor 12, size of the stator 11, resilience of the striking portion 30 and the portion 31 that is struck, current that is supplied to the field coil 23 and friction in the system.

A motor has been constructed in accordance with the illustrative embodiment which is approximately two and one-half inches in diameter and one and one-fourth inches thick that has a torque output of 20–22 in.-oz. at 150 r.p.m. The field coil of the constructed motor had 1575 turns of #30 AWG wire and was adapted to operate with a 115 volt, 60 cycles per second input. The rotor of the constructed motor had an aluminum main portion and the permanent magnet weights were carried by mechanically pivoted plastic members. Thus, the striking portions were plastic and the portions that were struck were aluminum.

The motor of the present invention, therefore, is a low speed, high torque motor which does not require a gear reduction system to obtain the low speed and high torque.

The motor of the present invention, as hereinbefore described in one embodiment, is merely illustrative and not exhaustive in scope. Since many widely different embodiments of the invention may be made without departing from the scope thereof, it is intended that all matter contained in the above description and shown in the accompanying drawing shall be interpreted as illustrative and not in a limiting sense.

What is claimed is:

1. A motor comprising: a casing; a rotor journalled in said casing; a plurality of weights radially spaced and pivotally mounted on said rotor, each of said weights having a permanent magnet slug affixed thereto and a portion for striking a substantially stiff radial arm of said rotor when said permanent magnet slugs are vibrated; field means for vibrating said permanent magnet slugs, said field means being disposed in said casing so as to circumscribe said rotor; and a one-way means for preventing backward rotation of said rotor, said means being connected to said casing.

2. A motor as in claim 1 wherein said field means is a spool wound coil having a plurality of magnetic metal rings laminated on each side thereof.

3. A motor as in claim 1 wherein said permanent magnet slugs have a north-south magnetic axis parallel to the rotational axis of said rotor.

4. A motor as in claim 1 wherein said field means is a spool wound coil having a plurality of magnetic metal rings laminated on each side thereof and said permanent magnet slugs have a north magnetic pole adjacent to one side of said spool and a south magnetic pole adjacent to an opposite side of said spool.

5. A motor as in claim 1 wherein said rotor is plastic and said weights are flexible appendages integrally formed thereon so as to strike said radial arms when said permanent magnet slugs are vibrated.

6. A motor comprising: a casing; a plastic rotor rotatably supported in said casing, said rotor having a plurality of integrally formed stiff radial arms and flexible appendages, said flexible appendages being adapted to vibrate against said radial arms, each of said flexible appendages having a permanent magnet slug affixed thereto; field means for vibrating said permanent magnet slug, said field means being disposed in said casing so as to circumscribe said rotor; and a one-way means for preventing backward rotation of said rotor, said means being connected to said casing.

7. A motor as in claim 6 wherein said field means is a spool wound coil having a plurality of magnetic metal rings laminated on each side thereof and said permanent magnet slugs have a north magnetic pole adjacent to one side of said spool and a south magnetic pole adjacent to an opposite side of said spool.

8. A motor comprising: a substantially cylindrically shaped casing having substantially flat ends; a shaft journalled in said ends of said casing; a rotor fixably mounted on said shaft so as to impart rotation thereto; a plurality of weights radially spaced and pivotally mounted on said rotor, each of said weights having a permanent magnet slug attached thereto so as to have a north-south axis parallel to said shaft and a portion for striking a radial arm of said rotor when said weights are vibrated; a stator annularly disposed in said casing so as to circumscribe said rotor, said stator having a spool wound coil with a plurality of magnetic metal rings laminated on each side thereof; means for connecting said coil to an alternating current power source so as to vibrate said weights against said radial arms of said rotor; and a one-way means for preventing backward rotation of said rotor, said means being mounted on one end of said casing so as to engage said shaft when said rotor is rotated in the wrong direction.

References Cited

UNITED STATES PATENTS

| | | | |
|---|---|---|---|
| 3,202,849 | 8/1965 | Neal | 310—37 |
| 3,320,445 | 5/1967 | Bey | 310—20 |
| 3,349,262 | 10/1967 | Gibbons | 310—37 |
| 3,351,789 | 11/1967 | Bertling | 310—37 |

MILTON O. HIRSHFIELD, *Primary Examiner.*

D. F. DUGGAN, *Assistant Examiner.*